(12) United States Patent
Harada et al.

(10) Patent No.: US 7,754,387 B2
(45) Date of Patent: Jul. 13, 2010

(54) SEPARATOR FOR BATTERY AND ALKALINE BATTERY

(75) Inventors: Toshimitsu Harada, Okayama (JP); Hisashi Nagi, Okayama (JP); Hiroyuki Kawai, Osaka (JP); Seiji Wada, Moriguchi (JP); Eiji Tano, Moriguchi (JP)

(73) Assignees: Kuraray Co., Ltd., Kurashiki-shi (JP); Panasonic Corporation, Kadoma-shi (JP)

(*) Notice: Subject to any disclaimer, the term of this patent is extended or adjusted under 35 U.S.C. 154(b) by 778 days.

(21) Appl. No.: 11/570,135

(22) PCT Filed: Jun. 13, 2005

(86) PCT No.: PCT/JP2005/010763
§ 371 (c)(1),
(2), (4) Date: Dec. 7, 2006

(87) PCT Pub. No.: WO2005/124895
PCT Pub. Date: Dec. 29, 2005

(65) Prior Publication Data
US 2008/0274409 A1 Nov. 6, 2008

(30) Foreign Application Priority Data
Jun. 17, 2004 (JP) .............................. 2004-179327

(51) Int. Cl.
*H01M 4/68* (2006.01)
(52) U.S. Cl. ...................... 429/248; 429/247; 429/129; 429/142; 428/364
(58) Field of Classification Search ........................ None
See application file for complete search history.

(56) References Cited

U.S. PATENT DOCUMENTS 3,475,355 A * 10/1969 Decker ........................ 521/181
3,585,081 A * 6/1971 Mirman ........................ 429/206
5,126,219 A * 6/1992 Howard et al. .............. 429/252

FOREIGN PATENT DOCUMENTS

| JP | 54 91721 | 7/1979 |
|----|----------|--------|
| JP | 57 105957 | 7/1982 |
| JP | 02 078150 | 3/1990 |
| JP | 57 105958 | 3/1990 |
| JP | 06 076807 | 3/1994 |
| JP | 09 035720 | 2/1997 |
| JP | 10 050290 | 2/1998 |
| JP | 11 260339 | 9/1999 |

OTHER PUBLICATIONS

Machine translation of JP 11-260339.*
U.S. Appl. No. 11/816,714, filed Aug. 21, 2007, Harada, et al.

* cited by examiner

*Primary Examiner*—Patrick Ryan
*Assistant Examiner*—Cynthia Lee
(74) *Attorney, Agent, or Firm*—Oblon, Spivak, McClelland, Maier & Neustadt, L.L.P.

(57) ABSTRACT

A separator for alkaline batteries which is obtained by bonding 5.0 to 45.0 g/m$^2$ of a highly hygroscopic macromolecular compound of the crosslinking type having carboxyl group to a wetlaid nonwoven fabric comprising an alkali-resistant fiber, followed by crosslinking the macromolecular compound, wherein a silicate compound is added to the highly hygroscopic macromolecular compound of the crosslinking type in an amount of $1.0 \times 10^{-4}$ to 10 mg/cm$^2$ per unit area of the separator. By adding the silicate compound, absorption of the electrolyte is increased, the electrolyte can be held for a long time, the electric resistance of the separator itself can be kept small, growth of dendrite can be suppressed, short circuit due to the formed dendrite can be prevented, the volume of the negative electrode material can be increased by suppressing the thickness of the separator after absorbing the electrolyte, impact of dropping can be endured, and oxidative degradation in the alkaline dry cells can be suppressed. An alkaline primary battery can be constructed using the separator.

14 Claims, No Drawings

SEPARATOR FOR BATTERY AND ALKALINE BATTERY

TECHNICAL FIELD

The present invention relates to a separator for batteries which is advantageously used for alkaline primary batteries such as alkaline manganese batteries, mercury batteries, silver oxide batteries and air zinc batteries and to an alkaline primary battery comprising the separator for batteries. More particularly, the present invention relates to a separator for alkaline primary batteries which is obtained by bonding a highly hygroscopic macromolecular compound of the crosslinking type comprising a specific silicate compound to a wetlaid nonwoven fabric comprising an alkali-resistant fiber, followed by crosslinking the macromolecular compound, and to an alkaline primary battery comprising the separator for batteries.

BACKGROUND ART

In general, a separator for separating the active material for the positive electrode and the active material for the negative electrode is used in alkaline primary batteries. Various properties such as those shown in the following are required for the separator.

1. Internal short circuit between the active material for the positive electrode and the active material for the negative electrode is prevented.
2. The absorption of the electrolyte is great, the ion conductivity is excellent, and the electric resistance is small so that the sufficient electromotive reaction can proceed.
3. When the separator is disposed at the inside of the battery, the volume occupied by the separator is small so that the amounts of the active material for the positive electrode and the active material for the negative electrode can be increased (the period of time of the use of the battery can be increased).
4. When the separator is disposed at the inside of the battery, the separator itself is not buckled by the impact of vibration and dropping while the battery is delivered or carried, and the short circuit does not take place.

To obtain the above properties, a separator for batteries in which a polyvinyl alcohol-based fiber exhibiting excellent chemical resistance, hydrophilic property and mechanical properties is used, and a cellulose-based fiber is used in combination to enhance the property of absorbing the electrolyte, is proposed (Patent Reference 1).

However, a problem arises in that the short circuit takes place due to so-called dendrite which is needle shaped zinc oxide separated by the action of the aluminum component added to zinc constituting the negative electrode to suppress generation of hydrogen in the electrolyte, and an abnormal decrease in the voltage occurs. As the result, the life of the battery is decreased.

Another problem arises in that the mixture of manganese dioxide and graphite used as the material of the positive electrode in the conventional alkaline manganese batteries causes oxidative degradation of the cellulose fiber present on the face of contact between the separator for alkaline manganese batteries and the positive electrode mix during storage at high temperatures, and the capacity of the positive electrode is decreased. As the result, the properties of the battery deteriorate.

On the other hand, further improvements in the properties of the battery are required for alkaline batteries due to the recent rapid growth in the use and the improvements in the properties of various digital instruments. The electric power applied to the instruments using a battery is gradually increasing, and a battery exhibiting an excellent discharging property under a great load is desired. An alkaline battery exhibiting an improved discharging property under a great load by using a mixture obtained by adding nickel oxyhydroxide to manganese dioxide as the active material for the positive electrode is practically used. However, since nickel oxyhydroxide has a stronger oxidizing ability than manganese oxide has, a problem arises in that the cellulose fiber in the above separator for alkaline batteries present at the face contacting the positive electrode mix is oxidatively degraded extremely rapidly, and the discharging property under a great load deteriorates.

To prevent the internal short circuit between the active material for the positive electrode and the active material for the negative electrode, it is proposed that a polyvinyl alcohol-based fiber and a cellulose fiber are treated by beating to form an alkali-resistant fiber, and a separator for batteries having a double layer structure is prepared with a combination of a dense layer having a great density of the fiber and a layer for holding fluids having a small density of the fiber (a coarse layer) (Patent Reference 2). However, it is difficult that the excellent property of absorbing fluids and the function of preventing the internal short circuit are simultaneously exhibited. When the relative amount of the dense layer is increased to prevent the short circuit due to dendrite, a problem arises in that the amount of the absorbed fluid decreases, and the internal short circuit takes place due to the insufficient amount of the absorbed fluid. As the result, the life of the battery decreases. When a highly beaten cellulose fiber is used for the dense layer, the buckling of the separator itself takes place by the impact of vibration and dropping while the battery is delivered or carried since the buckling resistance of the separator itself decreases, and the internal short circuit takes place.

There is still another problem in that the cellulose fiber present at the face of the separator contacting the manganese dioxide used as the active material for the positive electrode is oxidatively degraded, and the life of the battery decreases. Naturally, the cellulose fiber is more rapidly oxidatively degraded in a high performance battery (a battery exhibiting the excellent discharging property under a great load) using a substance for the positive electrode containing nickel oxyhydroxide, and the discharging property under great loads deteriorates.

On the other hand, a separator using a cellophane film in combination with paper or a nonwoven fabric using a combination of an alkali-resistant fiber and a cellulose fiber is adopted to prevent the internal short circuit. However, the above separator exhibits an inferior property of absorbing fluids, and it is necessary that the paper base material is used in a great amount to surely obtain the desired amount of the absorbed fluid. Therefore, the volume occupied with the separator increases in the battery, and the amounts of the active material for the positive electrode and the active material for the negative electrode are restricted. Due to the use of cellophane film and the increased amount of the paper base material, the distance between the electrodes increases, and the internal resistance increases. As the result, the discharging property of a great capacity cannot be obtained.

To enhance the property of absorbing fluids of the paper base material comprising the alkali-resistant fiber, separators for batteries prepared by impregnation and coating with 0.5 to 1.0 g/m$^2$ of a highly hygroscopic macromolecular compound of the crosslinking type are proposed (Patent References 3 to 5). However, since these separators cannot suppress the growth of dendrite, a problem arises in that the effective prevention of the short circuit due to dendrite is difficult, and the internal short circuit takes place.

An alkaline battery using a negative electrode mix made of an electrolyte in the gel form which contains a compound having silicon in a specific amount is proposed (Patent Reference 6). Although the above battery satisfies the requirement of the discharging property (in the test of discharge after the battery is kept at 60° C. for 1 month while the battery is intermittently discharged at 3.9Ω for 5 minutes every day), a problem arises in that buckling of the separator itself takes place after being dropped, and the internal short circuit takes place. Another problem arises in that the cellulose fiber at the face contacting the positive electrode mix containing manganese dioxide and graphite as the main components which is used in conventional alkaline batteries or the positive electrode mix using a combination of manganese dioxide and nickel oxyhydroxide exhibiting strong oxidizing ability (exhibiting an excellent discharging property under a great load) which is used in high performance batteries is oxidatively degraded, and the gap increases. As the result, the properties of the battery deteriorate due to the internal short circuit and the decrease in the capacity of the positive electrode.

Patent Reference 1: Japanese Patent Application Laid-Open No. Heisei 6 (1994)-163024

Patent Reference 2: Japanese Patent Application Laid-Open No. Heisei 10 (1998)-92411

Patent Reference 3. Japanese Patent Application Laid-Open No. Showa 57 (1982)-105957

Patent Reference 4: Japanese Patent Application Laid-Open No. Showa 57 (1982)-105958

Patent Reference 5: Japanese Patent Application Laid-Open No. Heisei 2 (1990)-078150

Patent Reference 6: Japanese Patent Application Laid-Open No. Heisei 9 (1997)-035720

DISCLOSURE OF THE INVENTION

Under the above circumstances, the present invention has an object of providing a separator for alkaline batteries which exhibits the advantages in that the property of absorbing the electrolyte is enhanced, the electrolyte can be held for a long time, oxidative degradation due to the mixture containing manganese dioxide and nickel oxyhydroxide used as the positive electrode mix is suppressed, the internal short circuit is prevented by suppressing the growth of dendrite at the negative electrode, the electric resistance of the separator itself is small, and the volumes of the positive electrode mix and the negative electrode mix can be increased by suppressing the thickness after absorbing the electrolyte. The present invention has a further object of providing an alkaline primary battery, in particular, a cylindrical alkaline primary battery, which can prevent the internal short circuit even under impact of vibration and dropping while the battery is delivered or carried.

As the result of intensive studies by the present inventors to achieve the above objects, it was found that, when a separator prepared by impregnating and coating a wetlaid nonwoven fabric using an alkali-resistant fiber with a specific amount of a highly hygroscopic macromolecular compound of the crosslinking type having carboxyl group and containing a silicate compound in an amount of $1.0 \times 10^{-4}$ to 10 mg/cm$^2$ per unit area of the separator, followed by crosslinking the macromolecular compound was used, the macromolecular compound could absorb the electrolyte and swell to fill pores of the nonwoven fabric, and the property of highly absorbing the fluid could be maintained for a long time. It was also found that the oxidative degradation with manganese dioxide of the active material for the positive electrode and with the mixture of nickel oxyhydroxide of the strong oxidizing agent could be suppressed, the growth of dendrite could be suppressed, the short circuit due to dendrite could be effectively prevented, and the impact of dropping could be endured. The present invention has been completed based on the knowledge.

The present invention provides a separator for alkaline batteries which is obtained by bonding 5.0 to 45.0 g/m$^2$ of a highly hygroscopic macromolecular compound of a crosslinking type having carboxyl group to a nonwoven fabric of a wet type comprising an alkali-resistant fiber, followed by crosslinking the macromolecular compound, wherein a silicate compound is added to the highly hygroscopic macromolecular compound of a crosslinking type in an amount such that $1.0 \times 10^{-4}$ to 10 mg/cm$^2$ of the silicate compound is comprised per unit area of the separator.

In accordance with the present invention, a separator for alkaline batteries which exhibits the advantages in that the property of absorbing the electrolyte is enhanced the electrolyte can be held for a long time, oxidative degradation due to the positive electrode mix is suppressed, the internal short circuit is prevented by suppressing the growth of dendrite, the electric resistance of the separator itself is small, and the volumes of the positive electrode mix and the negative electrode mix can be increased by suppressing the thickness after absorbing the electrolyte, can be obtained. By using the above separator, an alkaline battery which is resistant to the impact of vibration and dropping while the battery is delivered or carried can be obtained.

THE MOST PREFERRED EMBODIMENT TO CARRY OUT THE INVENTION

The present invention will be described specifically in the following.

As the highly hygroscopic macromolecular compound of the crosslinking type used in the present invention, any highly hygroscopic macromolecular compound can be used as long as the compound has a carboxyl group at the inside or at the terminal of the molecule, is the compound of the crosslinking type and exhibits excellent alkali resistance. As the highly hygroscopic macromolecular compound of the crosslinking type having carboxyl group, for example, carboxymethylcellulose, polyacrylic acid, salts of polyacrylic acid, poly ethacrylic acid, salts of polymethacrylic acid, polyitaconic acid, salts of polyitaconic acid, polymaleic acid, salts of polymaleic acid, polycrotonic acid, salts of polycrotonic acid and copolymers of maleic anhydride (isobutyl-maleic anhydride copolymers, methyl vinyl ether-maleic anhydride copolymers, styrene-maleic anhydride copolymers and polyacrylic acid-maleic anhydride copolymers) are preferable. The salts of polyacrylic acid, the salts of polymethacrylic acid, the salts of polyitaconic acid and the salts of polycrotonic acid are not limited to sodium salts, and potassium salts and lithium salts can also be used. Among these salts, potassium salts are preferable. In particular, potassium salts of polyacrylic acid and maleic anhydride copolymers are preferable from the standpoint of workability in the step of the impregnation and coating of the nonwoven fabric and the shielding property and the property of highly absorbing fluids as the separator in batteries.

The molecular weight of the above highly hygroscopic macromolecular compound of the crosslinking type is not particularly limited. It is preferable that the average molecular weight is in the range of 1,000 to 1,000,000. From the standpoint of the handling of viscous solutions and impregnation and coating of the nonwoven fabric, it is more preferable that the molecular weight is in the range of 5,000 to 800,000 and most preferably in the range of 10,000 to 500,000.

Examples of the crosslinking agent include epoxy resins soluble in water, typical examples of which include glycerol polyglycidyl ether, and polyethyleneimine. The highly hygroscopic macromolecular compound of the crosslinking type can be crosslinked by adding the crosslinking agent to the highly hygroscopic macromolecular compound of the crosslinking type having carboxyl group, followed by heating or the like treatment.

The molecular weight of the crosslinking agent is not particularly limited. It is preferable that the molecular weight is 20,000 or smaller and more preferably 15,000 or smaller. When the molecular weight exceeds 20,000, the viscosity is great, and the handling becomes difficult. The amount of the crosslinking agent is not particularly limited. For example, when polyacrylic acid soluble in water (a molecular weight of 200,000 to 300,000) is used as the highly hygroscopic macromolecular compound of the crosslinking type, it is preferable that the crosslinking agent is used in an amount of 0.01% to 30% by mass and more preferably 0.01 to 15% by mass of the highly hygroscopic macromolecular compound of the crosslinking type. When the amount of the crosslinking agent is less than 0.01% by mass, the highly hygroscopic macromolecular compound of the crosslinking type is occasionally not sufficiently crosslinked. It is sufficient for crosslinking the highly hygroscopic macromolecular compound of the crosslinking type that the amount is about 30% by mass, and an amount exceeding 30% by mass is not necessary.

As the nonwoven fabric used for the separator for batteries of the present invention, nonwoven fabrics prepared in accordance with the wetlaying using a synthetic fiber exhibiting excellent alkali resistance and/or an alkali-resistant cellulose fiber which can be formed into fibrils is preferable. As the synthetic fiber exhibiting excellent alkali resistance, at least one fiber selected from polyvinyl alcohol-based fibers, ethylene-vinyl alcohol-based copolymer fibers, polypropylene fibers, polyethylene fibers, polyamide fibers, polypropylene/polyethylene composite fibers, polypropylene/ethylene-vinyl alcohol-based copolymer composite fibers and polyamide/modified polyamide composite fibers can be used. Among these fibers, it is preferable that a polyvinyl alcohol-based fiber exhibiting excellent affinity with electrolytes (the wetting property) is used as the main component fiber or the binder fiber.

When the polyvinyl alcohol-based fiber is used as the main component fiber, fibers having a temperature of dissolution in water of 90° C. or higher and more preferably 100° C. or higher are preferable. Specifically, fibers comprising a vinyl alcohol-based polymer having an average degree of polymerization of 1,000 to 5,000 and a degree of saponification of 95% by mole or greater are preferable. The vinyl alcohol-based polymer may be a copolymer with other copolymer components. From the standpoint of resistance to water, it is preferable that the amount of the other copolymer component is 20% by mole or less and more preferably 10% by mole or less.

The vinyl alcohol-based polymer which is treated with aldehydes is also preferable.

It is not necessary that the polyvinyl alcohol-based fiber is composed of a vinyl alcohol-based polymer alone, and the polyvinyl alcohol-based fiber may comprise other polymers or may be a composite spun fiber or a mixed spun fiber (a sea-island fiber) with other polymers. From the standpoint of the property of absorbing the electrolyte, it is preferable that the polyvinyl alcohol fiber comprises the vinyl alcohol-based polymer in an amount of 30% by mass or greater, more preferably 50% by mass or greater and most preferably 80% by mass or greater. It is preferable the polyvinyl alcohol fiber has a fineness of 3.3 dtex or smaller and more preferably 1.5 dtex or smaller from the standpoint of the property for separation and the decrease in the thickness, and 0.01 dtex or greater and more preferably 0.07 dtex or greater from the standpoint of the property for paper making. The length of the fiber can be suitably decided in accordance with the fineness of the single fiber. From the standpoint of the property for paper making, it is preferable that the length of the fiber is 0.5 to 10 mm and more preferably 1 to 5 mm.

Examples of the alkali-resistant cellulose fiber which can be formed into fibrils, which is used for the nonwoven fabric constituting the separator for batteries of the present invention, include rayon fibers (including polynosic rayon fibers and organic solvent-typed cellulose fibers), acetate-based fibers and mercerized natural pulp (such as wood pulp, cotton linter pulp and hemp pulp). One or more types of the alkali-resistant cellulose fibers which can be formed into fibrils can be used after being dispersed into water and beaten by a beater, a disk refiner or a high speed beater until the prescribed freeness of water passage is obtained. When the alkali-resistant cellulose fiber which can be formed into fibrils is used, it is preferable that the beating is conducted until the Canadian Standard Freeness (CSF) is in the range of 0 to 700 ml and more preferably in the range of 0 to 550 ml and the content of the alkali-resistant cellulose fiber which can be formed into fibrils is in the range of 0 to 70% by mass and more preferably in the range of 20 to 60% by mass. When the alkali-resistant cellulose fiber is contained in an amount exceeding 70% by mass, the buckling resistance of the separator decreases, and there is the possibility that the buckling of the separator itself takes place by the impact of vibration and dropping while the battery is delivered or carried, and the internal short circuit takes place. The freeness described above is the Canadian Standard Freeness (CSF) which is measured in accordance with the standard Canadian method described in Japanese Industrial Standard P 8121.

When the alkali-resistant cellulose fiber is not used, it is preferable that a polyvinyl alcohol-based fiber having a sectional shape of a cocoon, a flat sectional shape or a round sectional shape and a fineness of 0.6 dtex or smaller is used as the alkali-resistant synthetic fiber. A polyvinyl alcohol-based fiber may be used after the beating to decrease the fineness, or a polyvinyl alcohol-based fiber having a flat sectional shape may be used without the beating.

As the binder used in the present invention, a polyvinyl alcohol-based binder is used from the standpoint of the alkali resistance and the property of absorbing the electrolyte. The binder may be a fiber-shaped binder, a powder-shaped binder or a binder as a solution. When the separator is prepared in accordance with the wet paper making process, the fiber-shaped binder is preferable. When the fiber-shaped binder is used, the fibers of the binder and the fibers of the main component fiber can be bonded together at the contact points alone while the binder is not completely dissolved and the fiber shape is maintained by controlling the content of water remaining before the drying, and the strength of the separator can be maintained without a decrease in the property of absorbing the electrolyte and an increase in the internal resistance of the battery. Therefore, it is preferable that the fiber-shaped binder is used.

When a polyvinyl alcohol-based binder fiber is used as the fiber-shaped binder, it is preferable that the temperature of dissolution in water is 60 to 90° C. and more preferably 70 to 90° C. Fibers comprising a polyvinyl alcohol-based polymer having an average degree of polymerization of about 500 to 3,000 and a degree of saponification of 97 to 99% by mole are preferable. Composite spun fibers and mixed spun fibers (sea-island fibers) with other polymers can also be used. From the standpoint of the property of absorbing the electrolyte and the mechanical properties, it is preferable that a polyvinyl alcohol-based binder fiber comprising the vinyl alcohol-based polymer in an amount of 30% by mass or more, more preferably 50% by mass or more and most preferably 80% by mass or more is used. From the standpoint of the dispersion in water, the adhesion with other components and the pore size, it is preferable that the fineness is about 0.01 to 3 dtex, and the length of the fiber is about 1 to 5 mm. Naturally, fibers other than the above fibers can be used in combination. It is preferable that the amount of the binder fiber is 5 to 30% by mass. When the amount of the binder fiber is less than 5% by mass, the tensile strength of the separator required in the step of assembly to form the battery cannot be obtained, and the wet strength in the step of coating and impregnation with the highly hygroscopic macromolecular compound of the crosslinking type cannot be maintained. Thus, the properties necessary for passing through the coating and impregnation step deteriorate. An amount of the binder exceeding 30% by weight is not preferable since the property of absorbing the electrolyte is poor and pores between the fibers in the nonwoven fabric are filled to increase the electric resistance.

The process for producing the nonwoven fabric used in the separator for batteries of the present invention will be described in the following. The above alkali-resistant synthetic fiber and/or the above alkali-resistant cellulose fiber which can be formed into fibrils is beaten to the prescribed freeness of water passage, and the alkali-resistant fiber and the polyvinyl alcohol-based fiber binder in suitable amounts are added and mixed together. Using the obtained mixture as the raw material, the nonwoven fabric used for the separator for batteries of the present invention can be obtained by preparing the nonwoven fabric in accordance with the wetlaying. The process for preparing the nonwoven fabric in accordance with the wetlaying is not particularly limited. For example, the desired nonwoven fabric can be prepared efficiently using a conventional paper making machine of the wet type Examples of the screen for the paper making include a round screen, a shorts screen and a long screen. The paper making can be conducted in accordance with the conventional process. Where necessary, a combination of different types of screens may be used for the paper making.

The nonwoven fabric obtained in accordance with the wetlaying is dried by a drier of the contact type (a Yankee drier), and the nonwoven fabric used for the separator for batteries of the present invention can be obtained.

Then, the obtained nonwoven fabric is coated or impregnated with the highly hygroscopic macromolecular compound of the crosslinking type so that the compound is bonded in an amount in the range of 5.0 to 45.0 g/m² and preferably in the range of 8.0 to 35.0 g/m². When the amount of the bonded highly hygroscopic macromolecular compound of the crosslinking type is less than 5.0 g/m², the internal short circuit due to the needle shaped dendrite cannot be sufficiently prevented. When the amount of the bonded highly hygroscopic macromolecular compound of the crosslinking type exceeds 45.0 g/m², the impedance (the resistance) of the separator itself increases, and the properties of the battery deteriorate. The thickness of the separator after absorbing the electrolyte providing the performance of the battery increases, and the relative volume occupied with the separator at the inside of the battery increases. Therefore, the desired discharging property of the battery under a great load cannot be obtained due to the restriction on the volume of the materials for the positive electrode and the negative electrode.

At this time, a silicate compound is added to the highly hygroscopic macromolecular compound of the crosslinking type in an amount such that $1.0\times10^{-4}$ to 10 mg/cm² of the silicate compound is comprised per unit area of the separator. By adding the silicate compound to the highly hygroscopic macromolecular compound of the crosslinking type in the above amount, the silicate compound forms a suitable network structure in the molecules. Due to this structure, the short circuit due to the dendrite can be prevented to a great degree, and the resistance to impact of vibration and dropping while the battery is delivered or carried can be remarkably improved.

When the amount of the silicate compound is less than $1.0\times10^{-4}$ mg/cm², the effect of suppressing the needle shaped dendrite is small. When the silicate compound is added to the highly hygroscopic macromolecular compound of the crosslinking type in an amount exceeding 10 mg/cm², viscosity rapidly increases, and the silicate compound is aggregated to form precipitates. Therefore, it becomes difficult that the uniform bonding of the macromolecular compound becomes difficult in the step of coating and impregnation of the nonwoven fabric. The capacity of discharge decreases, and the maintained voltage occasionally decreases. From the standpoint of suppressing the dendrite and improving the resistance to impact, it is preferable that the amount of the silicate compound is $50\times10^{-3}$ to 5 mg/cm² and most preferably $5.0\times10^{-2}$ to 1 mg/cm².

Examples of the silicate compound used in the present invention include silicates such as potassium silicate, sodium silicate, calcium silicate and magnesium silicate. The form of the silicate compound may be powder or liquid. Among these silicates, potassium silicate is preferable.

The process for adding the silicate compound to the highly hygroscopic macromolecular compound of the crosslinking type is not particularly limited as long as the nonwoven fabric obtained in accordance with the wetlaying is coated or impregnated with the macromolecular compound. The coating process is not particularly limited. Examples of the coating process include the roller transfer (using a roll coater), the process using an air knife coater and the process using a blade coater.

The drying step and the curing step will be described in the following. As the drier used in the drying step, any drier such as a drier of the contact type (a Yankee drier or a drier of the multi-cylinder type) or a drier of the non-contact type (a through drier with the heated air, an oven drier or an electrically heated (infrared) drier) can be used.

When the drying is conducted using a drier of the contact type, it is preferable that drying is conducted while the layer coated with the highly hygroscopic macromolecular compound of the crosslinking type is brought into contact with the face of the drier. When the drying is conducted using a drier of the non-contact type, it is preferable that the heat source is disposed at the side of the layer coated with the highly hygroscopic macromolecular compound of the crosslinking type. For example, when the through drier with the heated air is used, it is preferable that the heated air is blown to the face having the layer formed by the coating with the highly hygroscopic macromolecular compound of the crosslinking type.

In the curing step, similarly to the drying step, any of the driers of the contact type and the non-contact type can be used as the apparatus for the heat treatment. It is preferable that the temperature of the heat treatment during the curing is 100° C.

or higher. When the temperature is lower than 100° C., it takes 1 hour or longer for the heat treatment, and the condition is not suitable for the practical production. It is more preferable that the temperature is 150° C. or higher and most preferably 180° C. or higher to increase the productivity.

It is possible that the separator treated in the drying step and the curing step is treated by a heated press or a cold press so that the thickness is adjusted to a desired value, where necessary.

In the separator for alkaline batteries of the present invention, it is preferable that the degree of shielding for effectively preventing the internal short circuit due to the dendrite is in the range of 15 seconds/20 cm$^3$ or greater, more preferably 100 seconds/20 cm$^3$ or greater and most preferably 15 to 300 seconds/20 cm$^3$. When the degree of shielding is 15 seconds/20 cm$^3$ or greater, the shielding property is sufficient, and the internal short circuit due to the needle shaped dendrite of zinc oxide can be prevented. Moreover, the amount of the fluid is kept sufficient, and the decrease in the properties and the life of the battery can be prevented. The degree of shielding is an index for the "denseness" of the separator for alkaline batteries and can be obtained in accordance with the method described later.

It is preferable that the separator for alkaline batteries of the present invention has a buckling resistance of 1.96 N or greater and more preferably 1.96 to 5.88 N for preventing the buckling and the internal short circuit of the separator itself caused by the impact of vibration and dropping while the battery is delivered or carried. The buckling resistance in the present invention is an index for the so-called "stiffness" and can be obtained in accordance with the method described later.

As described above, to enhance the properties of the battery and increase the life of the battery, it is necessary that the volumes of the materials for the positive electrode and the negative electrode are increased, and the volume occupied with the separator is decreased. From this standpoint, it is preferable that the thickness of the separator after absorbing the electrolyte is 0.08 to 0.300 mm and more preferably 0.08 to 0.250 mm.

To obtain the sufficient electromotive force, it is preferable that the ion conductivity is excellent and the impedance (the resistance) of the separator itself is small. In particular, it is preferable for increasing the life of the battery that the separator itself holds the electrolyte and has small impedance even when the amount of the electrolyte is small in the final period of the battery reaction. As the value indicating the life of the battery it is preferable that an electric resistance (in particular, the electric resistance in the absence of the electrolyte after dehydration by centrifugation) of 1.0Ω or smaller and more preferably 0.5 to 0.8Ω is used.

By using the separator for alkaline batteries of the present invention, an alkaline battery which exhibits the high performance which can endure the discharge under a great load and has a long life can be obtained. The shape of the separator in the alkaline battery is not particularly limited. Examples of the shape include the cross strip shape (a cylindrical separator having a bottom portion having a cross structure) the round strip shape (a cylindrical separator formed by winding in the cylindrical form) and the spiral shape (a separator formed by winding in the spiral form). In particular, when the separator for alkaline batteries of the present invention is disposed in the alkaline battery, it is preferable that the face coated with the highly hygroscopic macromolecular compound of the crosslinking type is placed toward the negative electrode.

As for the material of the negative electrode among the materials of the electrodes constituting the alkaline battery zinc oxide can be used as the material of the negative electrode, and a gel form material comprising a 40% by mass aqueous solution of potassium hydroxide, a gelling agent and zinc powder can be used as the electrolyte. It is preferable that zinc powder not containing mercury, cadmium or lead is used. In particular, powder of a zinc alloy comprising at least one substance selected from bismuth, indium, calcium and aluminum is preferable. On the other hand, a positive electrode mix comprising manganese dioxide and graphite as the main components can be used as the material of the positive electrode. It is preferable that a positive electrode mix comprising nickel oxyhydroxide used in alkaline batteries exhibiting excellent discharging property under a great load is used. To surely maintain the advantages of the excellent discharging property under a great load and the maintenance of the storage property, it is preferable that the relative amounts of manganese dioxide and nickel oxyhydroxide are in the following range: manganese dioxide: nickel oxyhydroxide=(80 parts by mass:20 parts by mass) to (40 parts by mass:60 parts by mass).

The separator for alkaline batteries of the present invention may be used as the bottom paper of a cylindrical battery. When the separator obtained by coating the nonwoven fabric obtained in accordance with the wetlaying with the above highly hygroscopic macromolecular compound of the crosslinking type in an amount in the range of 20.0 to 45.0 g/m$^2$, followed by crosslinking the macromolecular compound is used, pores of the nonwoven fabric are filled due to the absorption of the electrolyte and the swelling, and the shielding property is surely exhibited. The excellent property of absorbing the fluid can be maintained for a long time. Therefore, the same properties as those exhibited by the conventional bottom paper (paper/cellophane/paper) can be exhibited. Thus, the separator for alkaline batteries of the present invention can be used as the bottom paper without any problems.

EXAMPLES

The present invention will be described more specifically with reference to examples in the following. However, the present invention is not limited to the examples. The physical properties in Examples and Comparative Examples were measured in accordance with the following methods.

(1) Temperature of Dissolution in Water (° C.)

Into 400 ml of water (20° C.), 2.6 g of a sample fiber was placed, and the temperature was raised at a rate of 1° C./minute under stirring at a speed of 280 rpm. The temperature at which the fiber was completely dissolved was used as the temperature of dissolution in water.

(2) Freeness of Water Passage (CSF) (ml)

The Canadian Standard Freeness (CSF) was measured in accordance with "the test method of the freeness of pulp" described in Japanese Industrial Standard P8121.

(3) Grammage (g/m$^2$)

The grammage was measured in accordance with "the method of measurement of the meter grammage of paper" described in Japanese Industrial Standard P 8124.

(4) Thickness (mm) and Density (g/cm$^3$)

Samples were taken at five portions of a prepared separator. After the samples were left standing under the standard environment (20° C.×65% RH) for 4 hours or longer, the thickness was measured by the PEACOCK Dial thickness Gauge H type (φ 10 mm×180 g/cm$^2$). The density was obtained by dividing the grammage by the thickness (5) Thickness after Absorbing the Electrolyte (mm)

After a sample was dipped into a 35% by mass aqueous solution of KOH (20° C.) for 30 minutes, the fluid bonded to the sample was drained while the sample having a square shape is held at an elevated position by holding one of the apices which are the intersections of two edges for 30 seconds. Then, the thickness of the separator was measured by the PEACOCK Dial thickness Gauge H type ($\phi$ 10 mm×180 g/cm$^2$).

(6) Air Permeability (cm$^3$/cm$^2$/Second)

The air permeability was measured using the Frasier air permeability tester (manufactured by TOYO SEIKI SEI-SAKU-SHO, Ltd.).

(7) Degree of Shielding (Second/20 cm$^3$)

After a separator was dipped into a 35% by mass aqueous solution of KOH (20° C.) for 30 minutes, the fluid bonded to the sample was drained while the sample having a square shape is held at an elevated position by holding one of the apices which are the intersections of two edges for 30 seconds. Then, the resultant separator was placed into a membrane filter cartridge (manufactured by ADVANTEC Co., Ltd.; the material of the housing: polypropylene; the inner diameter: 23 mm$\phi$). The cartridge was tightly sealed to provide the air tight condition. An injection syringe was inserted at the upper portion, and a load of 500 g was applied at the top of the syringe. The time required for the passage of 20 cm$^3$ of the air (second/20 cm$^3$) was measured.

(8) Absorption of a Fluid (g/25 cm$^2$)

After a sample having a size of 50 mm×50 mm was dipped into a 35% by mass aqueous solution of KOH (20° C.) under the condition of a bathing ratio of 1/100 for 30 minutes, the fluid bonded to the sample was drained while the sample having a square shape is held at an elevated position by holding one of the apices which are the intersections of two edges for 30 seconds. After the sample was dehydrated by centrifugation (3,000 rpm×10 minutes) using a centrifuge (HIMAC CT 5DL; manufactured by HITACHI, Ltd.), the weight was measured, and the absorption of a fluid was calculated in accordance with the following equation:

Absorption of a fluid(g/25 cm$^2$)=$WA/(10,000/25) \times (W2-W1)/W1$ wherein

WA = the grammage of the sample

W = the mass of the sample

W2 = the mass after being dehydrated by centrifugation (9) Buckling Resistance (N)

A sample (45 mm×50 mm) was wound twice in the cylindrical form and inserted into a cylinder having an inner diameter of 8 mm$\phi$ and a length of 40 mm and made of polypropylene. Then, a 35% by mass aqueous solution of KOH was added in a manner such that the sample placed in the cylinder was wet up to the upper end (the height: 45 cm). Using a handy compression tester (manufactured by KATO TECH Co., Ltd.; KES-G5), a compression plate (2 cm$^2$) was lowered at a rate of compression of 1 mm/second, and the compression strength of 5 mm of the sample at the outside of the cylinder was measured.

(10) Impedance (Resistance)

In accordance with the same procedures as those conducted in the measurements of the absorption of the entire fluids and the absorption of fluids in the fiber portion, a sample was dipped into a 35% by mass aqueous solution of KOH (20° C.) for 30 minutes. The impedance of the sample was measured by an impedance meter (KOKUYO ELECTRIC Co., Ltd.; KC-547 LCR METER) under the environment of the measurement of 20° C.×65% RH. The same samples was used in the following two conditions while the thickness was kept the same (0.100 mm): the condition having the sufficient fluid (the fluid bonded to the sample was drained while the sample having a square shape is held at an elevated position by holding one of the apices which are the intersections of two edges for 30 seconds) and the condition having no fluids after dehydration by centrifugation of the sample (3,000 rpm×10 minutes) using a centrifuge (HIMAC CT 5DL; manufactured by HITACHI, Ltd.).

(11) Evaluation of the Properties of a Battery

To evaluate the properties of a battery, an alkaline dry cell of size AA was prepared, and the discharging properties immediately after the preparation and after the storage at a high temperature (stored at 80° C. for 3 days) were compared. The discharging property was evaluated by the time of discharge before the final voltage reached 0.9 V while the battery was intermittently discharged in a manner such that the discharge was conducted for 5 minutes every day under a load of 3.9 $\Omega$ at a temperature of the environment of 20° C. With respect to the alkaline batteries in which a separator was disposed and a mixture of manganese dioxide and graphite was used as the material of the positive electrode (Examples 1 to 5), the properties were evaluated and expressed as the values relative to the values of the time of discharge of the battery obtained in Comparative Example 1 immediately after the preparation and after the storage at a high temperature, which are each set at 100. With respect to the alkaline batteries in which a mixture of manganese dioxide and nickel oxyhydroxide was used as the material of the positive electrode (Examples 6 and 7), the property was evaluate and expressed as the values relative to the values of the time of discharge of the battery obtained in Comparative Example 6 immediately after the preparation and after the storage at a high temperature, which are each set at 100. When the relative values immediately after the preparation and after the storage at a high temperature are 100 or greater, it is decided that the life is long, the internal short circuit did not take place, and the oxidative degradation was absent. The results are expressed as excellent when the relative value is 105 or greater, as good when the relative value is 100 or greater and smaller than 105 and as poor when the relative value is smaller than 100.

The process for preparation of a battery will be described specifically in Examples 1 and 6.

(12) Dropping Test

After ten batteries were prepared, the batteries were dropped from a position at the height of 1 m. When even a single battery among the ten batteries showed the short circuit after being dropped, the result is expressed as poor. When no batteries showed the short circuit after being dropped, the result is expressed as good.

Example 1

A polyvinyl alcohol-based main component fiber (VPB103×3; manufactured by KURARAY Co., Ltd.; the sectional shape: the cocoon shape), 1.1 dtex×3 mm, (the temperature of dissolution in water: 100° C. or higher) in an amount of 80% by mass and 20% by mass of a polyvinyl alcohol-based binder fiber (VINYLON binder; the sectional shape: the cocoon shape), 1.1 dtex×3 mm, (the temperature of dissolution in water: 70° C.) were mixed together to prepare a raw material. The prepared raw material was made into paper by a paper machine having a long screen and dried by a Yankee drier, and a base material of a wetlaid nonwoven fabric having a grammage of 30.5 g/m$^2$ and a thickness of 0.110 mm was obtained.

As the highly hygroscopic macromolecular compound of the crosslinking type having carboxyl group, polyacrylic acid (JURYMER AC-10LHP; manufactured by NIHON JUNYAKU Co., Ltd.; the average molecular weight: 250,000) was used. An aqueous solution of potassium hydroxide was mixed with the polyacrylic acid to prepare potassium polyacrylate. To the obtained compound, polyethyleneimine (EPOMIN SP-200; manufactured by NIPPON SHOKUBAI Co., Ltd.; the molecular weight: 10,000) was added in an amount of 1% by mass of the highly hygroscopic macromolecular compound of the crosslinking type. Then, an aqueous solution of potassium silicate (OHKA SEAL; manufactured by TOKYO OHKA KOGYO Co., Ltd.) was added in an amount such that potassium silicate was contained in an amount of $8.0 \times 10^{-2}$ mg/cm$^2$ per unit area of the separator. The obtained mixture was applied to one face of the base material of a wetlaid nonwoven fabric obtained above by a knife coater, and 10.5 g/m$^2$ of the highly hygroscopic macromolecular compound of the crosslinking type was bonded. After the obtained material was dried by a through drier with the heated air, the curing was conducted at 200° C. for 1 minute by the through drier with the heat air. The thickness was adjusted by a calender, and a separator for batteries having a grammage of 41.0 g/m$^2$ and a thickness of 0.130 mm was obtained.

To prepare and evaluate a battery, a material of the positive electrode composed of 94.3% by mass of manganese dioxide, 4.8% by mass of graphite powder and 0.93% by mass of a 40% by mass aqueous solution of KOH was uniformly mixed by a mixer and the particle size was adjusted to a prescribed value.

Manganese dioxide, having particle diameters in the range of 20 to 50 μm and graphite powder having particle diameters in the range of 10 to 25 μm were obtained by classification and used above. The material of the positive electrode which had been adjusted to have the prescribed particle size was compression molded into pellets having short cylindrical shapes.

As the material of the negative electrode, a material of the negative electrode in the gel form composed of 1% by mass of sodium polyacrylate as the gelling agent, 33% by mass of a 40% by mass aqueous solution of KOH, 66% by mass of powder of a zinc alloy and potassium silicate in an amount such that the concentration of the silicon element was 50 ppm by mass of the zinc powder was used. As the powder of a zinc alloy, a powder prepared by adding 200% by mass of bismuth, 500% by mass of indium and 30% by mass of aluminum to zinc powder was used.

Using the obtained pellets of the material for the positive material, the obtained material mixture for the negative electrode in the gel form, the obtained separator and a bottom paper (a VINYLON nonwoven fabric/cellophane VINYLON nonwoven fabric composite), a battery was formed by assembling the members in a manner such that the separator had the round strip structure (a cylindrical separator wound in the cylindrical shape), and the dropping test and the evaluation of the properties of the battery were conducted. The results are shown in Table 1.

Example 2

In accordance with the similar procedures to those conducted in Example 1, 35% by mass of a polyvinyl alcohol-based main component fiber (VPB103×3; manufactured by KURARAY Co., Ltd.; the sectional shape: the cocoon shape), 1.1 dtex×3 mm, (the temperature of dissolution in water: 100° C. or higher), 50% by mass of a material obtained by beating mercerized pulp to CSF=550 ml by a disk refiner and 15% by mass of a polyvinyl alcohol-based binder fiber (VPB105–1× 3; the sectional shape: the cocoon shape), 1.1 dtex×3 mm, (the temperature of dissolution in water: 70° C.) were mixed together to prepare a raw material. The prepared raw material was made into paper having two layers by a paper machine having a short screen and a round screen and dried by a Yankee drier, and a base material of a wetlaid nonwoven fabric having a grammage of 34.1 g/m$^2$ and a thickness of 0.110 mm was obtained. As the highly hygroscopic macromolecular compound of the crosslinking type having carboxyl group, an isobutyl-maleic acid copolymer (ISOBAM 10; manufactured by KURARAY Co., Ltd.; the average molecular weight: 160,000) was used. To the compound, polyethyleneimine (EPOMIN SP-200; manufactured by NIPPON SHOKUBAI Co., Ltd.; the molecular weight: 10,000) as the crosslinking agent was added in an amount of 1% by mass of the highly hygroscopic macromolecular compound of the crosslinking type. Then, an aqueous solution of potassium silicate (OHKA SEAL; manufactured by TOKYO OHKA KOGYO Co., Ltd.) was added in an amount such that potassium silicate was contained in an amount of $5.0 \times 10^{-3}$ mg/cm$^2$ per unit area of the separator. The obtained mixture was applied to one face of the base material of a wetlaid nonwoven fabric obtained above by a knife coater, and 12.2 g/m$^2$ of the highly hygroscopic macromolecular compound of the crosslinking type was bonded. After the drying, the curing and the adjustment of the thickness in accordance with the same procedures as those conducted in Example 1, a separator for batteries having a grammage of 46.3 g/m$^2$ and a thickness of 0.138 mm was obtained. Using the obtained separator and the same bottom paper as that used in Example 1, a battery was prepared, and the dropping test and the evaluation of the properties of the battery were conducted in accordance with the same procedures as those conducted in Example 1. The results are shown in Table 1.

Example 3

In accordance with the similar procedures to those conducted in Example 1, 40% by mass of a polyvinyl alcohol-based main component fiber (VPB103×3; manufactured by KURARAY Co., Ltd.; the sectional shape: the cocoon shape), 1.1 dtex×3 mm, (the temperature of dissolution in water: 100° C. or higher), 45% by mass of a material obtained by beating an organic solvent-spun rayon fiber, 1.7 dtex×2 mm, (TENCEL; manufactured by LENZING Company) to CSF=300 ml by a high speed decomposer and 15% by mass of a polyvinyl alcohol-based binder fiber (VINYLON binder; the sectional shape: the cocoon shape), 1.1 dtex×3 mm, (the temperature of dissolution in water: 70° C.) were mixed together to prepare a raw material. The prepared raw material was made into paper having two layers by a paper machine having a short screen and a round screen and dried by a Yankee drier, and a base material of a wetlaid nonwoven fabric having a grammage of 23.0 g/m$^2$ and a thickness of 0.115 mm was obtained. To polyacrylic acid (JURYMER AC-10LHP; manufactured by NIHON JUNYAKU Co., Ltd.; the average molecular weight: 250,000) which was the same material as that used in Example 1, an aqueous solution of potassium hydroxide was mixed to prepare potassium polyacrylate. To the obtained highly hygroscopic macromolecular compound of the crosslinking type, polyethyleneimine (EPOMIN SP-200; manufactured by NIPPON SHOKUBAI Co., Ltd.; the molecular weight: 10,000) as the crosslinking agent was added in an amount of 1% by mass of the highly hygroscopic macromolecular compound of the crosslinking type. Then, an aqueous solution of potassium silicate (manufactured by Wako Pure Chemical Industries, Ltd.) was added in an amount such that potassium silicate was contained in an amount of $1.0×10^{-1}$ mg/cm$^2$ per unit area of the separator. The obtained mixture was applied to one face of the base material of a wetlaid nonwoven fabric obtained above in accordance with the roller transfer process, and 8.0 g/m$^2$ of the highly hygroscopic macromolecular compound of the crosslinking type was bonded after the fluid was squeezed by a scraper. After the drying, the curing and the adjustment of the thickness in accordance with the same procedures as those conducted in Example 1, a separator for batteries having a grammage of 31.0 g/m$^2$ and a thickness of 0.148 mm was obtained. A battery was prepared in accordance with the same procedures as those conducted in Example 1 except that the obtained separator, the same bottom paper as that used in Example 1 and, as the material of the negative electrode, powder of a zinc alloy of the material of the negative electrode similar to that used in Example 1 but containing no silicon element were used. The dropping test and the evaluation of the properties of the battery were conducted in accordance with the same procedures as those conducted in Example 1. The results are shown in Table 1.

Example 4

A polyvinyl alcohol-based main component fiber (VPB053×3; manufactured by KURARAY Co., Ltd.; the sectional shape: the cocoon shape) 0.6 dtex×3 mm, (the temperature of dissolution in water: 100° C. or higher) in an amount of 30% by mass, 50% by mass of a polyvinyl alcohol-based main component fiber (VPB103×3; manufactured by KURARAY Co., Ltd.; the sectional shape: the cocoon shape), 1.1 dtex×3 mm, (the temperature of dissolution in water: 100° C. or higher) and 20% by mass of a polyvinyl alcohol-based binder fiber (VPB105–1×3; manufactured by KURARAY Co., Ltd.; the sectional shape: the cocoon shape) 1.1 dtex×3 mm, (the temperature of dissolution in water: 70° C.) were mixed together to prepare a raw material. The prepared raw material was made into paper by a paper machine having a short screen and dried by a Yankee drier, and a base material of a wetlaid nonwoven fabric having a grammage of 38.0 g/m$^2$ and a thickness of 0.120 mm was obtained. As the highly hygroscopic macromolecular compound of the crosslinking type having carboxyl group, the same material as that used in Example 1, i.e., polyacrylic acid (JURYMER AC-10LHP; manufactured by NIHON JUNYAKU Co., Ltd.; the average molecular weight: 250,000), was used. An aqueous solution of sodium hydroxide was mixed with the polyacrylic acid to prepare sodium polyacrylate. To the obtained highly hygroscopic macromolecular compound of the crosslinking type, polyethyleneimine (EPOMIN SP-200; manufactured by NIPPON SHOKUBAI Co, Ltd.) as the crosslinking agent was added in an amount of 1% by mass of the highly hygroscopic macromolecular compound of the crosslinking type. Then, an aqueous solution of potassium silicate (OHKA SEAL; manufactured by TOKYO OHKA KOGYO Co., Ltd.) was added in an amount such that potassium silicate was contained in an amount of $4.0×10^{-2}$ mg/cm$^2$ per unit area of the separator. The obtained mixture was applied to one face of the base material of a wetlaid nonwoven fabric obtained above by a knife coater, and 12.0 g/m$^2$ of the highly hygroscopic macromolecular compound of the crosslinking type was bonded. After the drying, the curing and the adjustment of the thickness in accordance with the same procedures as those conducted in Example 1, a separator for batteries having a grammage of 50.0 g/m$^2$ and a thickness of 0.130 mm was obtained. Using the obtained separator and the same bottom paper as that used in Example 1, a battery was prepared, and the dropping test and the evaluation of the properties of the battery were conducted in accordance with the same procedures as those conducted in Example 1. The results are shown in Table 1.

Example 5

A polyvinyl alcohol-based main component fiber (VPB103×3; manufactured by KURARAY Co., Ltd.; the sectional shape: the cocoon shape), 1.1 dtex×3 mm, (the temperature of dissolution in water: 100° C. or higher) in an amount of 60% by mass, 20% by mass of a mercerized pulp and 20% by mass of a polyvinyl alcohol-based binder fiber (VPB105–1×3; manufactured by KURARAY Co., Ltd.; the sectional shape: the cocoon shape), 1.1 dtex×3 mm, (the temperature of dissolution in water: 70° C.) were mixed together to prepare a raw material. The prepared raw material was made into paper by a paper machine having a short screen and dried by a Yankee drier, and a base material of a wetlaid nonwoven fabric having a grammage of 38.2 g/m$^2$ and a thickness of 0.120 mm was obtained. As the highly hygroscopic macromolecular compound of the crosslinking type having carboxyl group, the same macromolecular compound as that used in Example 1. i.e., polyacrylic acid (JURYMER AC-10LHP; manufactured by NIHON JUNYAKU Co., Ltd.; the average molecular weight: 250,000), was used. An aqueous solution of potassium hydroxide was mixed with the polyacrylic acid to prepare potassium polyacrylate. To the obtained highly hygroscopic macromolecular compound of the crosslinking type, polyethyleneimine (EPOMIN SP-200; manufactured by NIPPON SHOKUBAI Co., Ltd.) as the crosslinking agent was added in an amount of 1% by mass of the highly hygroscopic macromolecular compound of the crosslinking type. Then, an aqueous solution of potassium silicate (manufactured by Wako Pure Chemical Industries, Ltd.) was added in an amount such that potassium silicate was contained in an amount of $5.0×10^{-2}$ mg/cm$^2$ per unit area of the separator. The obtained mixture was applied to one face of the base material of a wetlaid nonwoven fabric obtained above by a knife coater, and 95 g/m$^2$ of the highly hygroscopic macromolecular compound of the crosslinking type was bonded. After the drying, the curing and the adjustment of the thickness in accordance with the same procedures as those conducted in Example 1, a separator for batteries having a grammage of 47.7 g/m$^2$ and a thickness of 0.126 mm was obtained.

To prepare and evaluate a battery, a positive electrode mix used in alkaline batteries exhibiting excellent discharging property under a great load, i.e., a mixture composed of 46.9% by mass of nickel oxyhydroxide, 46.9% by mass of manganese dioxide, 4.8% by mass of graphite powder, 0.47% by mass of a polyethylene powder and 0.93% by mass of a 40% by mass aqueous solution of KOH as the electrolyte, was uniformly mixed by a mixer, and the particle size was adjusted to a prescribed value. Nickel oxyhydroxide having particle diameters in the range of 5 to 15 μm, manganese dioxide having particle diameters in the range of 20 to 50 μm, and graphite powder having particle diameters in the range of 10 to 25 μm and polyethylene powder having particle diameters in the range of 5 to 15 μm were obtained by classification and used above. The material of the positive electrode which had been adjusted to have the prescribed particle size was compression molded into pellets having short cylindrical shapes.

A battery was prepared in accordance with the same procedures as those conducted in Example 1 except that the obtained separator, the same bottom paper as that used in Example 1, the above positive electrode mix prepared by mixing nickel oxyhydroxide with manganese dioxide and, as the material of the negative electrode, powder of a zinc alloy of the material of the negative electrode similar to that used in Example 1 but containing no silicon element were used. The dropping test and the evaluation of the properties of the battery were conducted in accordance with the same procedures as those conducted in Example 1. The results are shown in Table 1.

Example 6

A polyvinyl alcohol-based main component fiber (VPB033×3; manufactured by KURARAY Co., Ltd.; the sectional shape: the cocoon shape), 0.4 dtex×3 mm, (the temperature of dissolution in water: 100° C. or higher) in an amount of 30% by mass, 50% by mass of a polyvinyl alcohol-based main component fiber (VPB033×3; manufactured by KURARAY Co., Ltd.; the sectional shape: the cocoon shape), 1.1 dtex×3 mm, (the temperature of dissolution in water: 100° C. or higher) and 20% by mass of a polyvinyl alcohol-based binder fiber (VPB105-1×3; manufactured by KURARAY Co., Ltd.; the sectional shape: the cocoon shape), 1.1 dtex×3 mm, (the temperature of dissolution in water: 70° C.) were mixed together to prepare a raw material. The prepared raw material was made into paper by a paper machine having a short screen and dried by a Yankee drier, and a base material of a wetlaid nonwoven fabric having a grammage of 30.2 g/m$^2$ and a thickness of 0.117 mm was obtained. As the highly hygroscopic macromolecular compound of the crosslinking type having carboxyl group, the same material as that used in Example 1, i.e., polyacrylic acid (JURYMER AC-10LHP; manufactured by NIHON JUNYAKU Co., Ltd.; the average molecular weight: 250,000), was used. An aqueous solution of potassium hydroxide was mixed with the polyacrylic acid to prepare potassium polyacrylate. To the obtained highly hygroscopic macromolecular compound of the crosslinking type, polyethyleneimine (EPOMIN SP-200; manufactured by NIPPON SHOKUBAI Co., Ltd.) as the crosslinking agent was added in an amount of 1% by mass of the highly hygroscopic macromolecular compound of the crosslinking type. Then, an aqueous solution of potassium silicate (OHKA SEAL; manufactured by TOKYO OHKA KOGYO Co., Ltd.) was added in an amount such that potassium silicate was contained in an amount of 8.0×10$^{-2}$ mg/cm$^2$ per unit area of the separator. The obtained mixture was applied to one face of the base material of a wetlaid nonwoven fabric obtained above by a knife coater, and 28.0 g/m$^2$ of the highly hygroscopic macromolecular compound of the crosslinking type was bonded. After the drying, the curing and the adjustment of the thickness in accordance with the same procedures as those conducted in Example 1, a separator for batteries having a grammage of 58.2 g/m$^2$ and a thickness of 0.157 mm was obtained. A battery was prepared using the obtained separator, a bottom paper which was the separator obtained above and the same positive electrode mix containing nickel oxyhydroxide and the same material of the negative electrode containing no silicon element as those used in Example 5. Then, the dropping test and the evaluation of the properties of the battery were conducted in accordance with the same procedures as those conducted in Example 1. The results are shown in Table 1.

Comparative Example 1

A polyvinyl alcohol-based main component fiber (VPB033×2; manufactured by KURARAY Co., Ltd.; the sectional shape: the cocoon shape), 0.4 dtex×2 mm, (the temperature of dissolution in water: 100° C. or higher) in an amount of 35% by mass, 50% by mass of an organic solvent-spun rayon fiber (TENCEL, manufactured by LENZING Company), 1.7 dtex×2 mm, (CSF=300 ml) and 15% by mass of a polyvinyl alcohol-based binder fiber (VPB105-1×3; the sectional shape: the cocoon shape), 1.1 dtex×3 mm, (the temperature of dissolution in water: 70° C.) were mixed together to prepare a raw material. The prepared raw material was made into paper having two layers by a paper machine having a short screen and a round screen and dried by a Yankee drier, and a base material of a wetlaid nonwoven fabric having a grammage of 34.8 g/m$^2$ and a thickness of 0.114 in was obtained. A battery was prepared in accordance with the same procedures as those conducted in Example 1 using the obtained separator and the same bottom paper as that used in Example 1. The dropping test and the evaluation of the properties of the battery were conducted in accordance with the same procedures as those conducted in Example 1. The results are shown in Table 2.

Comparative Example 2

For the dense layer, 25% by mass of a polyvinyl alcohol-based main component fiber (VPB053×2; manufactured by KURARAY Co., Ltd.; the sectional shape: the cocoon shape), 0.6 dtex×2 mm, (the temperature of dissolution in water: 100° C. or higher), 70% by mass of an organic solvent-spun rayon fiber (TENCEL; manufactured by LENZING Company), 1.7 dtex×2 mm, (CSF=10 ml) and 5% by mass of a polyvinyl alcohol-based binder fiber (VPB105-1; manufactured by KURARAY Co., Ltd.; the sectional shape: the cocoon shape), 1.1 dtex×3 mm, (the temperature of dissolution in water: 70° C.) were mixed together to prepare a raw material. For the coarse layer, 25% by mass of a polyvinyl alcohol-based main component fiber (VPB053×2; manufactured by KURARAY Co., Ltd.; the sectional shape: the cocoon shape), 0.6 dtex×2 mm, (the temperature of dissolution in water: 100° C. or higher), 60% by weight of a polynosic rayon fiber, 0.6 dtex×2 mm, (not beaten; CSF=740 ml) and 5% by mass of a polyvinyl alcohol-based binder fiber (VPB105-1×3; manufactured by KURARAY Co., Ltd.; the sectional shape: the cocoon shape), 1.1 dtex×3 mm, (the temperature of dissolution in water: 70° C.) were mixed together to prepare a raw material. The prepared raw materials were made into paper having two layers by a paper machine having a short screen and a round screen. In the paper making, the grammage of the dense layer was adjusted at 20.0 g/m$^2$ and the grammage of the coarse layer was adjusted at 23.0 g/m$^2$. The obtained sheet was dried by a Yankee drier, and a separator for batteries having a grammage of 43.2 g/m$^2$ and a thickness of 0.120 mm was obtained. In accordance with the same procedures as those conducted in Example 2 using the same bottom paper as that used in Example 1, a battery was prepared, and the dropping test and the evaluation of the properties of the battery were conducted in accordance with the same procedures as those conducted in Example 1. The results are shown in Table 2.

Comparative Example 3

A polyvinyl alcohol-based main component fiber (VPB103×3; manufactured by KURARAY Co., Ltd.; the sectional shape: the cocoon shape), 1.1 dtex×3 mm, (the temperature of dissolution in water: 100° C. or higher) in an amount of 55% by mass, 30% by mass of a rayon fiber, 1.7 dtex×3 mm, (not beaten; CSF=760 ml) and 15% by mass of a polyvinyl alcohol-based binder fiber (VPB105-1×3; manufactured by KURARAY Co., Ltd.; the sectional shape: the cocoon shape), 1.1 dtex×3 mm, (the temperature of dissolution in water: 70° C.) were mixed together to prepare a raw material. The prepared raw material was made into paper having two layers by a paper machine having a short screen and a round screen and dried by a Yankee drier, and a separator for batteries having a grammage of 31.0 g/m$^2$ and a thickness of 0.110 mm was obtained. Using the obtained separator for batteries and a cellophane film #300 (manufactured by Futamura Chemical Co., Ltd.; the grammage: 30 g/m$^2$; the thickness: 0.020 mm) in combination and the same materials for the positive electrode and the negative electrode as those used in Example 1, a battery having the separator of the cross strip type was prepared, and the dropping test and the evaluation of the properties of the battery were conducted in accordance with the same procedures as those conducted in Example 1. The results are shown in Table 2.

Comparative Example 4

A polyvinyl alcohol-based main component fiber (VPB1033×3; manufactured by KURARAY Co., Ltd.; the sectional shape: the cocoon shape), 1.1 dtex×3 mm, (the temperature of dissolution in water: 100° C. or higher) in an amount of 40% by mass 50,% by mass of a mercerized pulp beaten to CSF=550 ml and 10% by mass of a polyvinyl alcohol-based binder fiber (VPB105–1×3; manufactured by KURARAY Co., Ltd.; the sectional shape: the cocoon shape), 1.1 dtex×3 mm, (the temperature of dissolution in water: 70° C.) were mixed together to prepare a raw material. The prepared raw material was made into paper by a paper machine having a long screen and dried by a Yankee drier, and a base material of a wetlaid nonwoven fabric having a grammage of 34.6 g/m$^2$ and a thickness of 0.110 mm was obtained. As the highly hygroscopic macromolecular compound of the crosslinking type having carboxyl group, the same material as that used in Example 1, i.e., polyacrylic acid (JURYMER AC-10LHP; manufactured by NIHON JUNYAKU Co., Ltd.; the average molecular weight: 250,000), was used. An aqueous solution of potassium hydroxide was mixed with the polyacrylic acid to prepare potassium polyacrylate. To the obtained potassium polyacrylate, polyethyleneimine (EPOMIN SP-200; manufactured by NIPPON SHOKUBAI Co, Ltd.) as the crosslinking agent was added in an amount of 1% by mass of the highly hygroscopic macromolecular compound of the crosslinking type. One face of the base material of a wetlaid nonwoven fabric obtained above was coated with the mixture obtained above in accordance with the roller transfer process, and 5.0 g/m$^2$ of the highly hygroscopic macromolecular compound of the crosslinking type was bonded after squeezing by a scraper. After the drying, the curing and the adjustment of the thickness in accordance with the same procedures as those conducted in Example 1, a separator for batteries having a grammage of 39.6 g/m$^2$ and a thickness of 0.120 mm was obtained. Using the obtained separator and the same bottom paper as that used in Example 1, a battery was prepared, and the dropping test and the evaluation of the properties of the battery were conducted in accordance with the same procedures as those conducted in Example 1. The results are shown in Table 2.

Comparative Example 5

A polyvinyl alcohol-based main component fiber (VPB053×2; manufactured by KURARAY Co, Ltd.; the sectional shape: the cocoon shape), 0.6 dtex×2 mm, (the temperature of dissolution in water: 100° C. or higher) in an amount of 30% by mass, 55% by mass of an organic solvent-spun rayon fiber (TENCEL; manufactured by LENZING Company), 1.7 dtex×2 mm, (CSF=300 ml) and 15% by mass of a polyvinyl alcohol-based binder fiber (VPB105–1×3; manufactured by KURARAY Co, Ltd.; the sectional shape: the cocoon shape), 1.1 dtex×3 mm, (the temperature of dissolution in water: 70° C.) were mixed together to prepare a raw material. The prepared raw material was made into paper by a paper machine having a short screen and dried by a Yankee drier, and a base material of a wetlaid nonwoven fabric having a grammage of 35.1 g/m$^2$ and a thickness of 0.116 mm was obtained. As the highly hygroscopic macromolecular compound of the crosslinking type having carboxyl group, the same material as that used in Example 1, i.e., polyacrylic acid (JURYMER AC-10LHP; manufactured by NIHON JUNYAKU Co, Ltd.; the average molecular weight: 250,000), was used. An aqueous solution of potassium hydroxide was mixed with the polyacrylic acid to prepare potassium polyacrylate. To the obtained potassium polyacrylate, polyethyleneimine (EPOMIN SP-200; manufactured by NIPPON SHOKUBAI Co., Ltd.) as the crosslinking agent was added in an amount of 1% by mass of the highly hygroscopic macromolecular compound of the crosslinking type. Then, an aqueous solution of potassium silicate (OHKA SEAL; manufactured by TOKYO OHKA KOGYO Co., Ltd.) was added in an amount such that potassium silicate was contained in an amount of 8.2×10$^{-2}$ mg/cm$^2$ per unit area of the separator. The base material of a wetlaid nonwoven fabric obtained above was impregnated with the obtained mixture, and 3.0 g/m$^2$ of the highly hygroscopic macromolecular compound of the crosslinking type was bonded after squeezing by a scraper. After the drying, the curing and the adjustment of the thickness in accordance with the same procedures as those conducted in Example 1, a separator for batteries having a grammage of 38.1 g/m$^2$ and a thickness of 0.130 mm was obtained. Using the obtained separator and the same bottom paper as that used in Example 1, a battery was prepared, and the dropping test and the evaluation of the properties of the battery were conducted in accordance with the same procedures as those conducted in Example 1. The results are shown in Table 2.

Comparative Example 6

A polyvinyl alcohol-based main component fiber (VPB053×2; manufactured by KURARAY Co., Ltd.; the sectional shape: the cocoon shape), 0.6 dtex×2 mm, (the temperature of dissolution in water: 100° C. or higher) in an amount of 30% by mass, 55% by mass of a mercerized pulp and 15% by mass of a polyvinyl alcohol-based binder fiber (VPB105–1×3; manufactured by KURARAY Co, Ltd.; the sectional shape: the cocoon shape), 1.1 dtex×3 mm, (the temperature of dissolution in water: 70° C.) were mixed together to prepare a raw material. The prepared raw material was made into paper by a paper machine having a short screen and dried by a Yankee drier, and a base material of a wetlaid nonwoven fabric having a grammage of 20.9 g/m$^2$ and a thickness of 0.090 mm was obtained. As the highly hygroscopic macromolecular compound of the crosslinking type having carboxyl group, the same material as that used in Example 1, i.e., polyacrylic acid (JURYMER AC-10LHP; manufactured by NIHON JUNYAKU Co., Ltd.; the average molecular weight: 250,000, was used. An aqueous solution of potassium hydroxide was mixed with the polyacrylic acid to prepare potassium polyacrylate. To the obtained potassium polyacrylate, polyethyleneimine (EPOMIN SP-200; manufactured by NIPPON SHOKUBAI Co., Ltd.) as the crosslinking agent was added in an amount of 1% by mass of the highly hygroscopic macromolecular compound of the crosslinking type. Then, an aqueous solution of potassium silicate (manufactured by Wako Pure Chemical Industries, Ltd.) was added in an amount such that potassium silicate was contained in an amount of $1.0 \times 10^{-1}$ mg/cm$^2$ per unit area of the separator. The base material of a wetlaid nonwoven fabric obtained above was impregnated with the obtained mixture, and 55.0 g/m$^2$ of the highly hygroscopic macromolecular compound of the crosslinking type was bonded after squeezing by a scraper. After the drying, the curing and the adjustment of the thickness in accordance with the same procedures as those conducted in Example 1, a separator for batteries having a grammage of 75.9 g/m$^2$ and a thickness of 0.175 mm was obtained. Using the obtained separator and the same bottom paper as that used in Example 1, a battery was prepared, and the dropping test and the evaluation of the properties of the battery were conducted in accordance with the same procedures as those conducted in Example 1. The results are shown in Table 2.

Comparative Example 7

Using the same raw materials as those used in Example 1 in accordance with the same process for paper making as that in Example 1, a base material of a wetlaid nonwoven fabric having a grammage of 30.8 g/m$^2$ and a thickness of 0.108 mm was obtained. As the highly hygroscopic macromolecular compound of the crosslinking type having carboxyl group, the same material as that used in Example 1, i.e., polyacrylic acid (JURYMER AC-10LHP; manufactured by NIHON JUNYAKU Co., Ltd.; the average molecular weight: 250,000), was used. An aqueous solution of potassium hydroxide was mixed with the polyacrylic acid to prepare potassium polyacrylate. To the obtained potassium polyacrylate, polyethyleneimine (EPOMIN SP-200; manufactured by NIPPON SHOKUBAI Co., Ltd.) as the crosslinking agent was added in an amount of 1% by mass of the highly hygroscopic macromolecular compound of the crosslinking type. Then, an aqueous solution of potassium silicate (Wake Pure Chemical Industries, Ltd.) was added in an amount such that potassium silicate was contained in an amount of $2.3 \times 10^{-6}$ mg/cm$^2$ per unit area of the separator. The base material of a wetlaid nonwoven fabric obtained above was coated with the obtained mixture by a knife coater, and 7.0 g/m$^2$ of the highly hygroscopic macromolecular compound of the crosslinking type was bonded. After the drying, the curing and the adjustment of the thickness in accordance with the same procedures as those conducted in Example 1, a separator for batteries having a grammage of 37.8 g/m$^2$ and a thickness of 0.130 mm was obtained. Using the obtained separator and the same bottom paper as that used in Example 1, a battery was prepared, and the dropping test and the evaluation of the properties of the battery were conducted in accordance with the same procedures as those conducted in Example 1. The results are shown in Table 2.

Comparative Example 8

Using the same raw materials as those used in Example 1 in accordance with the same process for paper making as that in Example 1, a base material of a wetlaid nonwoven fabric having a grammage of 30.5 g/m$^2$ and a thickness of 0.110 mm was obtained. As the highly hygroscopic macromolecular compound of the crosslinking type having carboxyl group, the same material as that used in Example 1, i.e., polyacrylic acid (JURYMER AC-10LHP; manufactured by NIHON JUNYAKU Co. Ltd.; the average molecular weight: 250,000), was used. An aqueous solution of potassium hydroxide was mixed with the polyacrylic acid to prepare potassium polyacrylate. To the obtained potassium polyacrylate, polyethyleneimine (EPOMIN SP-200; manufactured by NIPPON SHOKUBAI Co., Ltd.) as the crosslinking agent was added in an amount of 1% by mass of the highly hygroscopic macromolecular compound of the crosslinking type. Then, an aqueous solution of potassium silicate (OHKA SEAL; manufactured by TOKYO OHKA KOGYO Co., Ltd.) was added in an amount such that potassium silicate was contained in an amount of 15 mg/cm$^2$ per unit area of the separator. The base material of a wetlaid nonwoven fabric obtained above was coated with the obtained mixture by a knife coater, and 20.0 g/m$^2$ of the highly hygroscopic macromolecular compound of the crosslinking type was bonded. After the drying, the curing and the adjustment of the thickness in accordance with the same procedures as those conducted in Example 1, a separator for batteries having a grammage of 50.5 g/m$^2$ and a thickness of 0.145 mm was obtained. Using the obtained separator and the same bottom paper as that used in Example 1, a battery was prepared, and the dropping test and the evaluation of the properties of the battery were conducted in accordance with the same procedures as those conducted in Example 1. The results are shown in Table 2.

Comparative Example 9

Using the same separator and the same bottom paper as those used in Comparative Example 1 and, as the materials of the electrodes constituting the battery, the same material of the positive electrode as that used in Example 6 and the same gel material of the negative electrode as that used in Example 1, a battery was prepared, and the dropping test and the evaluation of the properties of the battery were conducted in accordance with the same procedures as those conducted in Example 1. The results are shown in Table 2.

TABLE 1

| Example | 1 | 2 | 3 | 4 | 5 | 6 |
|---|---|---|---|---|---|---|
| Composition of separator (%) | | | | | | |
| layer of nonwoven fabric | single | single | single | single | single | single |
| polyvinyl alcohol main component fiber (cocoon shape) 0.4 dtex × 3 mm | — | — | — | — | — | 30 |
| polyvinyl alcohol main component fiber (cocoon shape) 0.6 dtex × 3 mm | — | — | — | 30 | — | — |
| polyvinyl alcohol main component fiber (cocoon shape) 1.1 dtex × 3 mm | 80 | 35 | 40 | 50 | 60 | 50 |

TABLE 1-continued

| Example | 1 | 2 | 3 | 4 | 5 | 6 |
|---|---|---|---|---|---|---|
| polyvinyl alcohol main component fiber (flat shape) 1.6 dtex × 3 mm (CSF = 600) | — | — | — | — | — | — |
| solvent-spun rayon fiber 1.7 dtex × 2 mm (CSF = 10) | — | — | — | — | — | — |
| solvent-spun rayon fiber 1.7 dtex × 2 mm (CSF = 300) | — | — | 45 | — | — | — |
| mercerized pulp (not beaten) | — | — | — | — | 20 | — |
| mercerized pulp (CSF = 550 ml) | — | 50 | — | — | — | — |
| polynosic rayon 0.6 dtex × 2 mm (not beaten) (CSF = 740 ml) | — | — | — | — | — | — |
| rayon 1.7 dtex × 3 mm (not beaten) (CSF = 760 ml) | — | — | — | — | — | — |
| VINYLON binder fiber 1.1 dtex × 3 mm | 20 | 15 | 15 | 20 | 20 | 20 |
| Physical properties | | | | | | |
| grammage of base material of nonwoven fabric (g/m$^2$) | 30.5 | 34.1 | 23.0 | 38.0 | 38.2 | 30.2 |
| thickness of base material of nonwoven fabric (mm) | 0.110 | 0.110 | 0.115 | 0.120 | 0.120 | 0.117 |
| highly hygroscopic macromolecular compound *$^1$ | PPA | IB-MA | PPA | SPA | PPA | PPA |
| crosslinking agent *$^2$ | PEI | PEI | PEI | PEI | PEI | PEI |
| amount of bonded macromolecular compound (g/m$^2$) | 10.5 | 12.2 | 8.0 | 12.0 | 9.5 | 28.0 |
| process for coating with macromolecular compound | on one face | on one face | on one face | on one face | on one face | impregnating base material |
| amount of added silicate compound (mg/cm$^2$) | $8.0 \times 10^{-2}$ | $5.0 \times 10^{-3}$ | $1.0 \times 10^{-1}$ | $4.0 \times 10^{-2}$ | $5.0 \times 10^{-2}$ | $8.0 \times 10^{-2}$ |
| grammage of separator (g/m$^2$) | 41.0 | 46.3 | 31.0 | 50.0 | 47.7 | 58.2 |
| thickness of separator (mm) | 0.130 | 0.138 | 0.148 | 0.130 | 0.126 | 0.157 |
| density of separator (g/cm$^3$) | 0.315 | 0.336 | 0.209 | 0.385 | 0.379 | 0.371 |
| absorption of fluids (with fiber) (g/25 cm$^2$) | 0.167 | 0.165 | 0.278 | 0.178 | 0.139 | 0.390 |
| air permeability of base material of nonwoven fabric (cm$^3$/cm$^2$/sec) | 50.1 | 25.9 | 23.9 | 43.0 | 41.0 | 40.1 |
| degree of shielding (sec/20 cm$^3$) | 24.2 | 26.2 | 38.9 | 19.1 | 18.7 | not passing |
| impedance (having fluid) (Ω) | 0.634 | 0.662 | 0.671 | 0.720 | 0.770 | 0.694 |
| impedance (after dehydration by centrifugation) (Ω) | 0.890 | 0.798 | 0.849 | 0.784 | 0.720 | 0.810 |
| buckling resistance (N) | 5.10 | 3.42 | 2.15 | 3.92 | 3.53 | 4.41 |
| thickness after absorption of electrolyte (mm) | 0.172 | 0.240 | 0.238 | 0.168 | 0.19 | 0.270 |
| Bottom paper | | | | | | |
| VINYLON nonwoven fabric/cellophane/VINYLON nonwoven fabric composite | used | used | used | used | used | — |
| VINYLON nonwoven fabric coated with, highly hygroscopic macromolecular | — | — | — | — | — | used |

TABLE 1-continued

| Example | 1 | 2 | 3 | 4 | 5 | 6 |
|---|---|---|---|---|---|---|
| compound of cross-type | | | | | | |
| Electrode | | | | | | |
| positive electrode material (conventional: MnO₂ + graphite) | used | used | used | used | — | — |
| same (discharge under great load: MnO₂ + nickel oxyhydroxide) | — | — | — | — | used | used |
| silicon element in negative electrode material | 50 ppm | 50 ppm | none | none | none | none |
| Evaluation | | | | | | |
| dropping test (number/10 samples) | good | good | good | good | good | good |
| capacity after assembly of battery (life) | 114 | 107 | 109 | 101 | 120 | 108 |
| capacity after storage at 80° C. for 3 days | 109 | 105 | 108 | 102 | 125 | 121 |
| overall evaluation of battery properties | excellent | excellent | excellent | good | excellent | excellent |
| overall evaluation | excellent | excellent | excellent | good | excellent | excellent |

*[1] PPA: potassium polyacrylate; SPA: sodium polyacrylate; IB-MA: an isobutyl-maleic anhydride copolymer
*[2] PEI: polyethyleneimine

TABLE 2

| Comparative Example | 1 | 2 | | 3 | 4 | 5 | 6 | 7 | 8 | 9 |
|---|---|---|---|---|---|---|---|---|---|---|
| Composition of separator (%) | | | | | | | | | | |
| layer of nonwoven fabric | single | dense | coarse | single | single | single | single | single | single | single |
| polyvinyl alcohol main component fiber (cocoon shape) 0.4 dtex × 3 mm | 35 | — | — | — | — | — | — | — | — | 35 |
| polyvinyl alcohol main component fiber (cocoon shape) 0.6 dtex × 3 mm | — | 25 | 25 | 55 | — | 30 | 30 | — | — | — |
| polyvinyl alcohol main component fiber (cocoon shape) 1.1 dtex × 3 mm | — | — | — | — | 40 | — | — | 80 | 80 | — |
| polyvinyl alcohol main component fiber (flat shape) 1.6 dtex × 3 mm (CSF = 600) | — | — | — | — | — | — | — | — | — | — |
| solvent-spun rayon fiber 1.7 dtex × 2 mm (CSF = 10) | — | 70 | — | — | — | — | — | — | — | — |
| solvent-spun rayon fiber 1.7 dtex × 2 mm (CSF = 300) | 50 | — | — | — | — | 55 | — | — | — | 50 |
| mercerized pulp (not beaten) | — | — | — | — | — | — | 55 | — | — | — |
| mercerized pulp (CSF = 550 ml) | — | — | — | — | 50 | — | — | — | — | — |
| polynosic rayon 0.6 dtex × 2 mm (not beaten) (CSF = 740 ml) | — | — | 60 | — | — | — | — | — | — | — |
| rayon 1.7 dtex × 3 mm (not beaten) (CSF = 760 ml) | — | — | — | 30 | — | — | — | — | — | — |
| VINYLON binder fiber 1.1 dtex × 3 mm | 15 | 5 | 15 | 15 | 10 | 15 | 15 | 20 | 20 | 15 |
| Physical properties | | | | | | | | | | |
| grammage of base material of nonwoven fabric (g/m²) | 34.8 | 43.2 | | 31.0 | 34.6 | 35.1 | 20.9 | 30.8 | 30.5 | 34.8 |
| thickness of base material of nonwoven fabric (mm) | 0.114 | 0.120 | | 0.110 | 0.100 | 0.116 | 0.090 | 0.108 | 0.110 | 0.114 |

TABLE 2-continued

| Comparative Example | 1 | 2 | 3 | 4 | 5 | 6 | 7 | 8 | 9 |
|---|---|---|---|---|---|---|---|---|---|
| highly hygroscopic macromolecular compound *[1] | — | — | cellophane film | PPA | PPA | PPA | PPA | PPA | — |
| crosslinking agent *[2] | — | — | — | PEI | PEI | PEI | PEI | PEI | — |
| amount of bonded macromolecular compound (g/m$^2$) | — | — | 30.0 | 5.0 | 3.0 | 55.0 | 7.0 | 20.0 | — |
| process for coating with macromolecular compound | — | — | — | on one face | on one face | impregating base material | on one face | on one face | — |
| amount of added silicate compound (mg/cm$^2$) | none | none | none | none | $8.2 \times 10^{-2}$ | $1.0 \times 10^{-1}$ | $2.3 \times 10^{-6}$ | 15 | none |
| grammage of separator (g/m$^2$) | 34.8 | 43.2 | 61.0 | 39.6 | 38.1 | 75.9 | 37.8 | 50.5 | 34.8 |
| thickness of separator (mm) | 0.114 | 0.120 | 0.130 | 0.120 | 0.130 | 0.175 | 0.130 | 0.145 | 0.114 |
| density of separator (g/cm$^3$) | 0.305 | 0.360 | 0.469 | 0.330 | 0.293 | 0.434 | 0.291 | 0.348 | 0.305 |
| absorption of fluids (with fiber) (g/25 cm$^2$) | 0.103 | 0.129 | 0.160 | 0.120 | 0.162 | 0.389 | 0.159 | 0.322 | 0.103 |
| air permeability of base material of nonwoven fabric (cm$^3$/cm$^2$/sec) | 8.3 | 7.8 | not passing | 7.4 | 8.8 | 21.0 | 50.2 | 50.1 | 8.3 |
| degree of shielding (sec/20 cm$^3$) | 7.3 | 12.0 | not passing | 16.1 | 11.3 | not passing | 16.0 | 30.1 | 7.3 |
| impedance (having fluid) (Ω) | 0.801 | 0.781 | 0.635 | 0.781 | 0.761 | 0.781 | 0.718 | 0.698 | 0.801 |
| impedance (after dehydration by centrifugation) (Ω) | 1.021 | 1.275 | 1.291 | 0.899 | 0.901 | 1.022 | 0.990 | 0.998 | 1.021 |
| buckling resistance (N) | 1.18 | 1.16 | 1.26 | 1.97 | 1.72 | 1.99 | 4.42 | 4.99 | 2.10 |
| thickness after absorption of electrolyte (mm) | 0.152 | 0.187 | 0.260 | 0.160 | 0.152 | 0.353 | 0.156 | 0.189 | 0.152 |
| Bottom paper | | | | | | | | | |
| VINYLON nonwoven fabric/cellophane/VINYLON nonwoven fabric composite | used | used | — | used | used | used | used | used | used |
| VINYLON nonwoven fabric coated with highly hygroscopic macromolecular compound of crosslinking type | — | — | — | — | — | — | — | — | — |
| Electrode | | | | | | | | | |
| positive electrode material (conventional: MnO$_2$ + graphite) | used | used | used | used | used | used | used | used | — |
| same (discharge under great load: MnO$_2$ + nickel oxyhydroxide) | — | — | — | — | — | — | — | — | used |
| silicon element in negative electrode material | 50 ppm | 50 ppm | 50 ppm | 50 ppm | 50 ppm | 50 ppm | 50 ppm | 50 ppm | 50 ppm |
| Evaluation | | | | | | | | | |
| dropping test (number/10 samples) | poor | poor | poor | good | good | good | good | good | poor |
| capacity after assembly of battery (life) | 100 | 98 | 99 | 100 | 100 | 98 | 98 | 92 | 100 |
| capacity after storage at 80° C. for 3 days | 100 | 76 | 70 | 75 | 81 | 76 | 79 | 69 | 100 |
| overall evaluation of battery property | good | poor | poor | poor | poor | poor | poor | poor | good |
| overall evaluation | poor | poor | poor | poor | poor | poor | poor | poor | poor |

*[1] PPA: potassium polyacrylate;
*[2] PEI: polyethyleneimine

As shown in Tables 1 and 2, the separators in Examples 1 and 2 were prepared by coating one face of the wetlaid nonwoven fabric comprising the alkali-resistant fiber with the macromolecular compound obtained by adding the silicate compound to the highly hygroscopic macromolecular compound of the crosslinking type having carboxyl group, followed by crosslinking the macromolecular compound. These separators surely showed the absorption of the electrolyte per unit area, in particular the absorption with the fiber, of about 1.0 to 1.5 times as much as those shown by the separator having no highly hygroscopic crosslinked macromolecular compound (Comparative Example 1, 2 and 3). In particular, the impedance (in the condition considered to be anhydrous, i.e., after being dehydrated by centrifugation) showed as small value as $1.00\Omega$ or smaller, and the life of the battery tended to be increased.

The shielding necessary for preventing the needle shaped dendrite could be surely obtained and maintained. The buckling resistance was 1.96 N or greater, and the separator resistant to dropping could be obtained. In the evaluation of the property of the battery, it is found that the discharging property after storage at 80° C. for 3 days could be improved by about 5 to 9% in comparison with that in Comparative Example 1.

It is shown by the results in Example 3 that the separator prepared by coating one face of the wetlaid nonwoven fabric comprising the alkali-resistant fiber with the macromolecular compound obtained by adding the silicate compound to the highly hygroscopic macromolecular compound of the crosslinking type having carboxyl group, followed by crosslinking the macromolecular compound exhibited the effect of preventing the growth of needle shaped dendrite without adding silicon element into the zinc alloy of the material of the negative electrode. The property of the battery was about the same as that in Examples 1 and 2, and the battery could be used without problems.

It is shown by the results in Example 4 that, between the salts of polyacrylic acid of the highly hygroscopic macromolecular compound of the crosslinking type having carboxyl group, the potassium salt gave the better result than the sodium salt although the sodium salt could be used without problems.

It is shown by the results in Example 5 that the separator of the present invention could be used without problems in the alkaline battery using the material of the positive electrode in which nickel oxyhydroxide was mixed with manganese dioxide to improve the discharging property under a great load, and the performance could be remarkably improved in comparison with the conventional separators using a synthetic fiber and a cellulose-based fiber. The performance of the alkaline battery using the material of the positive electrode in which nickel oxyhydroxide was mixed with manganese dioxide to improve the discharging property under a great load was remarkably improved from that of the conventional alkaline batteries.

It is shown by the results in Example 6 that the battery of Example 6 using as the bottom paper the separator prepared by coating the wetlaid nonwoven fabric comprising the alkali-resistant fiber with the macromolecular compound prepared by adding the silicate compound to the highly hygroscopic macromolecular compound of the crosslinking type having carboxyl group showed about the same result as that shown in Example 5 with respect to the resistance to dropping and the properties of the battery and could be used without problems.

In Comparative Example 1, although the absorption of the fluid and the rate of absorption were satisfied, the degree of shielding was 13 seconds or smaller to show an inferior degree of shielding, and it is difficult that the formation of dendrite is prevented. The impedance after the dehydration by centrifugation was great. The buckling resistance was smaller than 1.96 N. Therefore, buckling of the separator itself took place by the impact of vibration and dropping while the battery was delivered or carried, and the internal short circuit took place at the inside of the battery.

In Comparative Example 2, the life of the battery could not be increased since the degree of shielding was smaller than 13 seconds and the impedance after the dehydration by centrifugation was great. The buckling resistance of the separator was smaller than 196 N. Therefore, buckling of the separator itself took place by the impact of vibration and dropping while the battery was delivered or carried, and the internal short circuit took place at the inside of the battery.

In Comparative Example 3, although the degree of shielding was excellent, the impedance after the dehydration by centrifugation was great, and the property of the battery after storage at the high temperature decreased. The buckling resistance was smaller than 1.96 N. Therefore, buckling of the separator itself took place by the impact of vibration and dropping while the battery was delivered or carried, and the internal short circuit took place at the inside of the battery.

In Comparative Example 4, the absorption of the fluid by the fiber was satisfied, the degree of shielding was 15 seconds or greater, the buckling resistance of the separator was 1.96 N or greater and the impedance after the dehydration by centrifugation was small. However, the discharging property after storage at 80° C. for 3 days was poor, and the prevention of the internal short circuit due to dendrite was impossible.

In Comparative Example 5, the absorption of the electrolyte with the fiber was satisfied, the impedance after the dehydration by centrifugation was small, and the buckling resistance was 1.96 N or greater. However, the shielding property was insufficient since the degree of shielding was smaller than 15 seconds. It was difficult that the highly hygroscopic macromolecular compound of the crosslinking type covered the entire separator itself, and it was impossible that the growth of dendrite was prevented. Since the entire separator itself was not covered with the highly hygroscopic macromolecular compound of the crosslinking type, the mercerized pulp of the wetlaid nonwoven fabric contacting the manganese dioxide of the material of the positive electrode was oxidatively degraded, and the discharging property after storage at 80° C. for 3 days was poor.

In Comparative Example 6, the absorption of the electrolyte with the fiber was satisfied, the buckling resistance was 1.96 N or greater, and the degree of shielding was 15 seconds or greater. However, the property of the battery was poor since the impedance after the dehydration by centrifugation was great. The thickness after absorbing the electrolyte was great, and it was difficult that the volume of the material of the negative electrode was increased. Therefore, the battery had a short life.

In Comparative Example 7, the absorption of the electrolyte was satisfied, the degree of shielding was 15 seconds or greater, and the buckling resistance was 1.96 N or greater. However, due to the small amount of the silicate compound, it was difficult that the growth of dendrite was prevented at the surface of the separator, and abnormal discharge was also found.

In Comparative Example 8, the absorption of the electrolyte was satisfied, the degree of shielding was 15 seconds or greater, and the buckling resistance was 1.96 N or greater. However, due to the great amount of the silicate compound, the voltage was low, and the discharging property after storage at 80° C. for 3 days was poor.

In Comparative Example 9, although the absorption was satisfied, the shielding property was poor, and it was difficult that the formation of dendrite was prevented. Since the impedance was great and the buckling resistance was smaller than 1.96 N, the resistance to dropping was poor, and the internal short circuit took place due to the buckling of the separator itself. Then the separator was used for the alkaline battery in which nickel oxyhydroxide was mixed with the material of the positive electrode exhibiting the excellent discharging property under a great load, fibrils of the organic solvent-spun cellulose contacting the material of the positive electrode was oxidatively degraded, and the battery had a short life since the internal short circuit took place.

INDUSTRIAL APPLICABILITY

In accordance with the present invention, a separator for alkaline batteries which exhibits the advantages in that absorption of the electrolyte is increased, the electrolyte can be held for a long time, oxidative degradation due to the positive electrode mix is suppressed, growth of dendrite can be suppressed to prevent the internal short circuit, the electric resistance of the separator itself is small, and the volumes of the materials for the positive electrode and the negative electrode can be increased since the thickness after absorbing the electrolyte can be kept small, can be obtained. Also, an alkaline primary battery which is resistant to impact of vibration and dropping while the battery is delivered or carried can be obtained by disposing the separator.

The invention claimed is:

1. A separator for alkaline primary batteries which is obtained by bonding 5.0 to 45.0 g/m$^2$ of a highly hygroscopic macromolecular compound of a crosslinking type having a carboxyl group to a nonwoven fabric of a wet type comprising an alkali-resistant fiber, followed by crosslinking the macromolecular compound, wherein a silicate compound is added to the highly hygroscopic macromolecular compound of a crosslinking type in an amount so that said silicate compound comprises $1.0 \times 10^{-4}$ to 5 mg/cm$^2$ per unit area of the separator, wherein the alkali-resistant fiber comprises a polyvinyl alcohol-based fiber, and the silicate compound is potassium silicate.

2. The separator for alkaline primary batteries according to claim 1, which has a degree of shielding of 15 seconds or greater, a buckling resistance of 1.96 N or greater, a thickness of 0.300 mm or smaller after absorbing an electrolyte and an impedance (an electric resistance) of 1.00 Ω or smaller.

3. The separator for alkaline primary batteries according to claim 1, wherein said highly hygroscopic macromolecular compound of a crosslinking type having a carboxyl group is at least one compound selected from salts of polyacrylic acid and copolymers of maleic acid.

4. The separator for alkaline primary batteries according to claim 1, wherein said highly hygroscopic macromolecular compound of a crosslinking type having a carboxyl group is potassium polyacrylate.

5. The separator for alkaline primary batteries according to claim 1, wherein the silicate compound is potassium silicate.

6. An alkaline primary battery which is equipped with a separator for alkaline primary batteries according to claim 1.

7. An alkaline primary battery which is equipped with a separator for alkaline primary batteries according to claim 2.

8. An alkaline primary battery which is equipped with a separator for alkaline primary batteries according to claim 3.

9. An alkaline primary battery which is equipped with a separator for alkaline primary batteries according to claim 4.

10. An alkaline primary battery which is equipped with separator for alkaline primary batteries according to claim 5.

11. The separator for alkaline primary batteries according to claim 1, wherein the nonwoven fabric further comprises a rayon fiber.

12. The separator for alkaline primary batteries according to claim 1, wherein the highly hygroscopic macromolecular compound is a carboxymethyl cellulose.

13. An alkaline primary battery separator, comprising:
a highly hydroscopic macromolecular compound, a nonwoven fabric, an alkali-resistant fiber, and a silicate compound;
wherein the highly hydroscopic macromolecular compound is bonded to the nonwoven fabric,
the nonwoven fabric is a wet type and comprises the alkali-resistant fiber,
the highly hydroscopic macromolecular compound has a carboxyl group and is crosslinked,
the highly hydroscopic macromolecular compound is bonded to the nonwoven fabric in an amount of 5.0 to 45.0 g/m$^2$,
the silicate compound is present in an amount of $1.0 \times 10.4$ to 5 mg/cm$^2$ per unit area of the separator,
the alkali resistant fiber comprises a polyvinyl alcohol fiber, and
the silicate compound is potassium silicate.

14. The separator for alkaline primary batteries according to claim 1, wherein the highly hygroscopic macromolecular compound is crosslinked with a crosslinking agent selected from the group consisting of glycerol polyglycidyl ether and polyethylene imine.

* * * * *